United States Patent
Ohmory et al.

[11] Patent Number: 5,972,501
[45] Date of Patent: Oct. 26, 1999

[54] EASILY FIBRILLATABLE FIBER

[75] Inventors: Akio Ohmory; Hayami Yoshimochi, both of Kurashiki; Tomoyuki Sano, Okayama; Satoru Kobayashi, Okayama; Syunpei Naramura, Okayama; Masahiro Satoh, Kurashiki, all of Japan

[73] Assignees: Kuraray Co., Ltd., Kurashiki; Matsushita Electric Industrial Co., Ltd., Kadoma, both of Japan

[21] Appl. No.: 08/983,133

[22] PCT Filed: May 20, 1996

[86] PCT No.: PCT/JP96/01322

§ 371 Date: Jan. 20, 1998

§ 102(e) Date: Jan. 20, 1998

[87] PCT Pub. No.: WO97/44511

PCT Pub. Date: Nov. 27, 1997

[51] Int. Cl.$^6$ ..................................... D02G 3/00
[52] U.S. Cl. ............................. 428/370; 428/373
[58] Field of Search .................... 428/370, 373, 428/374

[56] References Cited

U.S. PATENT DOCUMENTS

| | | |
|---|---|---|
| 5,229,057 | 7/1993 | Ohmory et al. . |
| 5,238,995 | 8/1993 | Fukunishi et al. . |
| 5,455,114 | 10/1995 | Ohmory et al. . |
| 5,486,418 | 1/1996 | Ohmory et al. .......................... 428/373 |

FOREIGN PATENT DOCUMENTS

| | | |
|---|---|---|
| 648871 | 4/1995 | European Pat. Off. . |
| 58-38526 | 8/1983 | Japan . |
| 4-11014 | 1/1992 | Japan . |
| 258117 | 10/1993 | Japan . |

*Primary Examiner*—Newton Edwards
*Attorney, Agent, or Firm*—Oblon, Spivak, McClelland, Maier & Neustadt, P.C.

[57] ABSTRACT

A fiber of sea-islands phase separation wherein the sea component comprises a vinyl alcohol based polymer with high orientation and great crystallinity and the islands component comprises a water-insoluble cellulose based polymer with excellent absorptivity of alkaline solutions, thermal resistance and heat fusion resistance, and wherein the size of the islands is 0.03 to 10 $\mu$m and the strength is 3 g/d or more, is readily disintegrated into a fibril of a diameter of 0.05 to 8 $\mu$m when a mechanical stress is imposed onto the fiber wet in water.

From the fibril with good hydrophilicity, high strength, great particle captivity and excellent reinforcing performance, and additionally with good absorptivity of alkaline solutions and great thermal resistance and heat fusion resistance, none of the fiber components therein is solubilized during fibrillation. Neither a beating process nor a beating solution causes foaming or environmental pollution.

The fibril is extremely useful for use in separator sheets for alkaline batteries, reinforcing fibers of cement slate plates, reinforcing fibers of frictional materials and the like.

3 Claims, No Drawings

# EASILY FIBRILLATABLE FIBER

BACKGROUND OF THE INVENTION

1. Field of the Invention

The present invention relates to a readily fibrillatable fiber comprising a vinyl alcohol based polymer (abbreviated to "PVA" hereinafter) and a cellulose polymer; more specifically, the present invention relates to a fiber and a fibril, characterized in that the fiber is readily modified into a superfine fibril through the single action of chemically swelling force or mechanical stress or the combination thereof and is therefore preferable for use in wet laid or dry laid nonwoven fabrics, separators in alkaline batteries, reinforcing fibers for friction materials and reinforcing fibers for cement products.

2. Description of the Prior Art

Nonwoven fabrics comprising PVA fibers have been used conventionally as the separators of alkaline manganese batteries due to their strong alkaline resistance. Following the development of electronics a nd information and communication systems in recent years, far advanced performance has been demanded toward batteries, while mercury-free batteries have also been needed from the respect of pollution-free battery production and disposal. Additionally, more outstanding separating potency has been required for separators for use in batteries because of the demand for higher performance without mercury. Therefore, PVA fibers of a finer denier have been prepared for use in the separators of alkaline manganese batteries, and a PVA fiber of 0.3 denier is now commercially available. The absorptivity of alkaline solutions (namely, absorption in weight of aqueous KOH solution) as a very significant property for the separators in alkaline manganese batteries cannot sufficiently be satisfied by simply preparing a PVA fiber of a finer denier.

In order to overcome these problems, use has been made of a separator comprising a mixture of a PVA fiber of a finer denier and a polynosic fiber as one cellulose fiber with great absorptivity of alkaline solutions which is readily fibrillatable into a superfine fibril through beating. Disadvantageously, however, the polynosic fiber may cause public hazards in the production process. Additionally, the polynosic fiber has such poor beatability that the central part of the fiber remains as a thick stem in the resulting fibril. Thus, it is very difficult to recover a fibril sufficiently finely disintegrated to such an extent that the stem is also disintegrated. Hence, it has been desired a PVA fiber fibrillatable into a superfine fibril and having greater absorptivity of alkaline solutions and higher alkaline resistance.

As the reinforcing fibers of a variety of friction materials for use in automobile brakes and clutch plates, conventionally, asbestos has been used commonly in terms of the trapping performance of inorganic particles, thermal resistance, heat fusion resistance, reinforcing properties and the like. However, the use of asbestos has been put under strict regulations because of concern that asbestos may be harmful for human health. In recent years, therefore, the fibril of costly aramide fiber has been replacing asbestos. However, aramide fiber is so costly that it is only used in a limited fashion. Thus, low-cost materials with insufficient reinforcing performance, such as natural pulp, are used practically. Accordingly, a fiber has been desired which is less expensive than aramide fiber and fibrillatable so that the fiber might procure particle trapping performance, thermal resistance, heat fusion resistance and reinforcing properties in combination.

Asbestos has been used conventionally as a reinforcing fiber for cement products such as slate plate, but the use thereof is strictly regulated by the same reason as described above. PVA fibers have been used as an alternative to asbestos because the fibers have greater resistance to the alkalis in cement, but because PVA fibers have larger fiber sizes than that of asbestos, the green strength of the slate reinforced with the fibers is low. In order to supplement the strength, the fibers should be used in combination with fibrils of natural pulp and the like. If any fibrillatable PVA fiber is present, conventional laborious works required to use PVA fibers and natural pulp in combination can be eliminated.

In order to produce a superfine synthetic fiber, furthermore, a great number of attempts have been made conventionally to utilize the phase separation phenomenon of blend polymers. For example, Japanese Patent Publication No. 10617/1974, Japanese Patent Publication No. 17609/1976, Japanese Patent Application Kokai (Laid-open) No. 56925/1973 and Japanese Patent Application Kokai (Laid-open) No. 6203/1974 describe individually that a sea-islands fiber comprising a acrylonitrile polymer as the sea component and a PVA graft copolymer with acrylonitrile or a methyl methacrylate polymer as the islands component is fibrillatable through beating. But these techniques belong to modification technology of so-called polyacrylonitrile fiber comprising polyacrylonitrile as the sea component. Because polyacrylonitrile fiber is poor in terms of alkali resistance and good absorptivity of alkaline solutions, the fiber cannot be used in the utilities demanding excellent performance in these terms or the utilities demanding thermal resistance.

Japanese Patent Publication No. 31376/1972 also discloses a readily fibrillatable PVA fiber comprising a completely saponified PVA as the sea component and a partially saponified PVA as the islands component, but the fiber has a drawback such that the partially saponified water-soluble PVA is solubilized during the beating process in water for fibrillation, involving severe foaming during beating.

SUMMARY OF THE INVENTION

Therefore, a PVA fiber has strongly been desired, comprising PVA containing a higher amount of the same hydroxyl group as in wood pulp as the sea component, with a lower degree of foaming due to the solubilization of the fiber component during beating, ready fibrillatability, higher absorptivity of alkaline solutions and/or greater thermal resistance and heat fusion resistance, and additionally with greater strength. However, such fiber has not yet been produced.

In such circumstances, the present inventors have made investigations to finally attain the present invention.

The present invention consists in a readily fibrillatable fiber of a sea-islands structure, comprising PVA (A) and a water-insoluble cellulose polymer (B), wherein A and B compose the sea component and the islands component, respectively, in the fiber cross section, characterized in that the size of the islands is 0.03 µm to 10 µm on average and the tensile strength is 3 g/d or more.

DETAILED DESCRIPTION OF THE INVENTION

In the fiber of the present invention, PVA is the sea component. It is essentially very important for achieving the object of the present invention that the sea component, namely continuous phase, comprises PVA of which the molecular chain can readily be oriented and crystallized, from which a high-strength fibril can readily be produced, which has greater alkaline resistance and higher thermal resistance and which contains a greater amount of hydrophilic hydroxyl group in the same manner as wood pulp.

PVA herein referred to is not with specific limitation, so long as the PVA contains the vinyl alcohol unit of 70 mole % or more, including vinyl alcohols copolymerized with monomers at a ratio of less than 30 mole %, such as ethylene, itaconic acid, vinylamine, acrylamide, vinyl pivalate, maleic anhydride, and a vinyl compound containing sulfonic acid. Any vinyl alcohol from saponified vinyl ester is satisfactory with no specific limitation, provided that the saponification degree thereof is 80 mole % or more. For orientation and crystallization, nevertheless, the content of the vinyl alcohol unit therein is preferably 95 mole % or more, more preferably 98 mole % or more, still more preferably 99 mole % or more and most preferably 99.8 mole % or more.

The polymerization degree of PVA is not with specific limitation. In order to produce a fibril of a higher strength, however, the polymerization degree is preferably 500 or more, more preferably 1500 or more. In order to improve the hot-water resistance, at a post-reaction after fiber preparation, PVA may be acetalized within the molecules or between the molecules with aldehyde compounds typified by for example formaldehyde; or PVA may be cross linked with a cross-linking agent.

In the fiber of the present invention, a water-insoluble cellulose polymer is the islands component. The water-insoluble cellulose polymer includes cellulose of itself, cellulose acetates such as cellulose diacetate and cellulose triacetate, cellulose nitrate, and water-insoluble celluloses with a lower substitution, such as methyl cellulose, ethyl cellulose, hydroxyethyl cellulose and carboxymethyl cellulose. Among them, cellulose is preferable because cellulose has higher absorptivity of alkaline solutions, low swelling property in water, hydrophilicity, and thermal resistance and heat fusion resistance; cellulose acetate is preferable because of low compatibility with PVA, low water absorptivity, thermal resistance and heat fusion resistance, and ready fibrillatability in particular. Starch is disadvantageous in that starch is amorphous with larger solubility, so starch does not belong to the water-insoluble cellulose polymer group in accordance with the present invention. For example, cellulose acetate saponified into cellulose by a reaction after fiber preparation may be satisfactory; particularly when cellulose acetate used as the raw material of a water-insoluble cellulose polymer is saponified into cellulose after the polymer is prepared into a fiber, the resulting fiber is readily fibrillatable. Therefore, such polymer is most preferable in accordance with the present invention. Once dissolved, cellulose polymer turns amorphous, so it is difficult to orient and crystallize the polymer to provide a higher strength to the polymer. In order to effectively utilize the unique properties of the polymer, namely higher absorptivity of alkaline solutions with less water swelling property together with the thermal resistance and heat fusion resistance thereof, rather, it is significant that cellulose polymer should be present as the islands component, namely dispersed component.

Preferably, the sea/islands ratio, namely the weight ratio of PVA/cellulose polymer, is 95/5 to 50/50. Below 5% of the cellulose polymer as the islands component, the fiber is hardly fibrillatable. Below 50% of the sea component PVA, the cellulose polymer partially forms the sea component, so that PVA cannot form any apparent matrix phase, involving difficulty in producing a fibril with a higher strength. The weight ratio of PVA/cellulose polymer is more preferably 90/10 to 52/48, still more preferably 80/20 to 55/45 and most preferably 75/25 to 60/40.

The average size of the islands is 0.03 to 10 $\mu$m. In accordance with the present invention, the size of islands is determined as follows. The fiber of the present invention is subjected to a process for giving water resistance to the fiber, and is then prepared as an ultra-thin section of the fiber cross section. The section is stained with osmium tetraoxide and enlarged with a transmission-type electron microscope to 20,000 to 60,000 magnification. The areas of individual islands are determined on an enlarged cross-sectional photograph, to calculate an equivalent diameter of a circle of the same area as each of those islands. The size of islands is defined as the additive average of the equivalent diameters of the islands. If the average diameter is less than 0.03 $\mu$m, the size of islands is so small that the fiber is fibrillated with much difficulty; if the size of islands is above 10 $\mu$m, the resulting fibril is so large (in other words, the fibril is so thick) that the fibril cannot serve the essential role as a fibril and the fibril furthermore readily causes trouble in fiber preparation process, disadvantageously for processability. The size of islands is preferably 0.1 to 6 $\mu$m, and more preferably 0.5 to 3 $\mu$m. In the fiber of the present invention, the cross-sectional shape of islands is preferably of a non-circular shape or of an irregular shape, because the areas of the sea components in contact with the islands components are so large that readily disintegrable parts are increased, with the resultant readier fibrillation of the fiber.

In the fiber of the present invention, still additionally, a three-phase may be satisfactorily present, wherein PVA is dispersed in the islands comprising the cellulose polymer (in other words, islands are dispersed in the islands). In the case of a fiber of such three-phase structure, the islands phase of itself is disintegrated, which is effective for producing a far finer fibril.

The readily fibrillatable fiber of the present invention should have a tensile strength (sometimes referred to simply as "strength" hereinafter) of 3 g/d or more. If the strength is less than 3 g/d, then, the fiber cannot be used for utilities demanding strength, such as battery separator, the reinforcing fiber of frictional materials, and the reinforcing fiber of cement slate plates. Furthermore, generally, a fiber of a lower degree of the strength is hardly fibrillatable, disadvantageously. The strength should be preferably 4 g/d or more, more preferably 5 g/d or more, and still more preferably 7 g/d or more. In accordance with the present invention, the strength of the fiber is determined according to JIS L1015. The fiber of a strength of 3 g/d or more is produced by a method described below.

The fiber of the present invention preferably has a property of a beatability of 30 minutes or less. The term "beatability" in accordance with the present invention refers to the duration of agitation and beating as measured as follows; leaving a fiber sample (4 g) to stand in an atmosphere at 20° C. and a relative humidity of 65%, cutting the sample into 2-mm pieces, adding water (400 cc) at 20° C. into the cut pieces and charging the pieces in a mixer manufactured by Matsushita Electric Industry, Co. Ltd. (National MX-X40) prior to agitation and beating at 11,000 rpm for a given period of time, subsequently sampling the beaten solution in water dispersion and measuring the water filtration time of the solution by a method described below, the duration of agitation and beating required for the water filtration time to reach 60 seconds is referred to as beatability. The term "water filtration time" means a time required for filtering a beaten solution in water dispersion (750 cc) containing a fibril of 0.5 g through a 350-mesh metallic filter mounted on the lower end part of an open-bottom measuring cylinder of a diameter of 63 mm.

At a beatability above 30 minutes, the fiber is sometimes not fibrillated when used practically or the fiber is so insufficiently fibrillated that the fiber may not be used for the objective use. It is needless to say that even a fiber with poor fibrillatability may possibly be fibrillated by some procedures including the prolongation of the duration of beating or the application of more severe beating conditions, but the fibril produced in such a manner is at a state such that the fibril is tangling to each other or the fibril is cut further in shorter pieces, so such fibril is not suitable for the intended use. More preferable is a fiber of a water filtration time of 75 seconds or more after 5-min beating, and a fiber with such water filtration time can be produced by a method described below. The term "water filtration time after 5-minute beating" means a time required for passing a water dispersion (750 cc) containing a fibril of 0.5 g through the aforementioned measuring cylinder with a metallic filter mounted on the lower end part, after 5-minute beating under the same conditions as those for measuring the beatability as described above.

A method for producing the fiber of the present invention will now be described hereinbelow. Firstly, it is important that the aforementioned PVA (A) and the water-insoluble cellulose polymer (B) be dissolved in a common solvent. Such common organic solvent includes a mixture of dimethyl sulfoxide (abbreviated to "DMSO" hereinafter), dimethylacetamide and dimethylformamide with a metal salt such as zinc chloride, if the cellulose polymer is cellulose acetate or cellulose nitrate. The use of an organic solvent can facilitate the gel spinning of PVA to produce a fiber of a higher strength.

The two polymers are dissolved in a common organic solvent to a final A/B weight ratio of 95/5 to 50/50. The resulting spinning solution is not necessarily a completely clear, uniform solution, depending on the compatibility between PVA and the cellulose polymer. In order to produce a sea-islands fiber wherein the PVA of the present invention is the sea component and the cellulose polymer is the component of islands each of an average size of 0.03 to 10 $\mu$m, the spinning solution should preferably be a solution of a sea-islands phase separation structure wherein PVA is the sea and the cellulose polymer is the islands. However, the size of the islands at the stage of the spinning solution is never required to be 0.03 to 10 $\mu$m, because the phase separation status varies due to the presence of the solvent or depending on the solidifying conditions. Factors determining the sea-islands structure include the compatibility, compositional ratio, and polymer concentrations of the two polymers, the type of the organic solvent, and the temperature of the spinning solution, and by appropriately controlling these factors, importantly, the processability such as spinnability should be compatible with performance such as ready fibrillatability, strength, and water resistance. The viscosity of the spinning solution is appropriately 10 to 400 poises for wet spinning process; the viscosity is appropriately 50 to 2,000 poises for dry-jet wet spinning process. The viscosity is far lower than the viscosity for melt spinning, which may work as a factor enabling the formation of islands of a non-circular shape or an irregular shape.

Water conventionally employed as a spinning solvent for PVA cannot be used because water cannot dissolve the water-insoluble cellulose polymer. In order to improve the strength and dyeability of viscose rayon, a method has been known conventionally, comprising adding an aqueous PVA solution to a viscose solution, and spinning the solution into an aqueous solution containing mirabilite and sulfuric acid. The fiber produced by the method contains PVA as the islands component and a regenerated cellulose as the sea component, and the fiber is therefore different from the fiber of the present invention, in terms of strength and fibrillatability. Even if the PVA level is increased in the method so that the PVA might be the sea component, the resulting fiber is far poorer than the fiber of the present invention, from the respect of performance such as fibrillatability and strength.

It is a very significant point for the method for producing the fiber in accordance with the present invention that PVA and a cellulose polymer be dissolved at a given ratio in a common solvent to prepare a spinning solution of a sea-islands structure, so that PVA might be the sea component and the cellulose polymer might be the islands component.

The spinning solution thus produced is then passed through a spinning nozzle in a solidifying bath for wet spinning process or dry-jet wet spinning process. Because the wet spinning process comprising directly contacting a solidifying bath with a spinning nozzle can effect spinning without fibrous fusion even if the pitch of the nozzle orifices is narrowed, the process is suitable for spinning by means of a multi-orifice nozzle. Alternatively, a dry-jet wet spinning process where an air gap is arranged between a solidifying bath and a spinning nozzle is suitable for high-speed spinning because of a larger drawing ratio of a discharged polymer solution at the air gap part. In accordance with the present invention, the wet spinning process or dry-jet wet spinning process may be appropriately selected, depending on the object and use.

In accordance with the present invention, the solidifying solvent is with no specific limitation, but preference is given to an organic solvent in which PVA can generate fine crystals at a low temperature whereby uniform gelation is induced, such as alcohols including methanol and ethanol, ketones including acetone and methyl ethyl ketone and a mixed solution of the solvent of the spinning solution and these solvents. Solvents readily inducing non-uniform solidification, such as aqueous mirabilite solution, are not preferable.

Uniformly solidified gel yarn is transferred to processes of wet drawing, extraction and washing, oiling, drying, and dry drawing, and dry heat process if necessary, to prepare a sea-islands fiber wherein the sea component PVA is oriented and crystallized.

For leading the yarn formed in the solidifying bath into an extraction bath to remove the solvent of the spinning solution contained in the yarn, furthermore, a final extraction bath comprising three components of alcohols, ketones and water with a weight ratio of the alcohols to ketones at 9/1 to 1/9 and at a water content of 1 to 30% by weight based on the total weight of the three components, can effectively yield a very excellent, readily fibrillatable fiber, capable of satisfying the required performance of a water filtration time of 75 seconds or more. The alcohols in the final extraction bath include for example methanol, ethanol, propanol and butanol. Also, the ketones include for example methyl isopropyl ketone, methyl-n-butyl ketone, and methyl isobutyl ketone; ketones having a higher boiling point than that of water, for example methyl-n-butyl ketone and methyl isobutyl ketone, are preferable from the respect of generating more excellent, ready fibrillatability. If the weight ratio of the alcohols to the ketones is outside the range of 9/1 to 1/9, the resulting beatability may not be very excellent. If the water content is less than 1% by weight, the beatability is neither very excellent; if above 30% by weight, the fiber fuses to each other, causing the deterioration of the strength of the fiber and the like. The reason why the fibrillatability is improved by using such final extraction bath composed of the three components is not clearly elucidated.

The size of the islands is determined by the sea-islands phase separation structure at the state of the spinning solution described above and by the balance between the gelling performance and the phase separation performance at the solidifying stage. As the size of the islands is larger at the state of the spinning solution and as the gelling rate at the solidifying stage is lower and the rate of phase separation is higher, the size of the islands in the resulting fiber is likely to be larger. The factors determining the gelling performance and the phase separation performance at the solidifying stage include the composition and temperature of the solidifying bath, the retention time therein, the temperature of the spinning solution immediately before discharge from a spinning nozzle, and the shear rate, and the like. Thus, by generally controlling the factors determining the size of the islands at the state of the spinning solution and at the solidifying stage, the fiber of the present invention with the islands of an average size of 0.03 to 10 $\mu$m can be produced.

The fiber thus produced can be modified in the performance thereof through chemical reaction. By immersing the fiber of the present invention with PVA as the sea component and cellulose acetate as the islands component in 1N caustic soda at 50° C. for 30 minutes to saponify cellulose acetate, a fiber is produced wherein PVA is present as the sea component while the cellulose with higher absorptivity of alkaline solutions, thermal resistance and heat fusion resistance is present as the islands component. As has been mentioned so far, the fiber is most preferable among the types of the fiber of the present invention.

In order to improve the hot water resistance of the fiber, the fiber is immersed in an aqueous mixed solution of aldehydes typified by for example formaldehyde and acids such as sulfuric acid, to acetalize the amorphous part of PVA intramolecularly or intermolecularly.

In accordance with the present invention, furthermore, a water-insoluble cellulose polymer (B) and a polymer (C) dissolvable in an amine oxide solvent or an aqueous solution thereof and different from the polymer (B), are dissolved at a B/C weight ratio of 95/5 to 5/95 in an amine oxide solvent or an aqueous solution thereof, to prepare a sea-islands phase separation solution wherein B is the sea component and C is the islands component or wherein B is the islands component and C is the sea component. Then, by spinning the solution as a spinning solution into a solidifying bath by wet spinning process or by dry-jet wet spinning process, a readily fibrillatable fiber of a sea-islands structure can be produced. The polymer (C) includes acrylate based polymers such as polymethyl methacrylate and polymethyl acrylate, acrylonitrile based polymers such as polyacrylonitrile and a copolymer of acrylonitrile and styrene, vinyl ester based polymers typified by for example polyvinyl acetate, alkylene glycol based polymers such as polyethylene glycol, starch and its derivative polymers, and cellulose based polymers different from the polymer (B), in addition to PVA; PVA (A) described above is particularly preferable in this case, from the respect of ready fibrillatability, high strength and alkali resistance.

When an amine oxide solvent is used as the solvent of the spinning solution as in the present method, the cellulose phase of the resulting fiber has a higher strength than a fiber comprising conventional cellulose polymers, and therefore, such fiber is readily fibrillatable. The weight ratio of the polymer (C) to the water-insoluble cellulose polymer (B) is possibly within the range of 95/5 to 5/95 wider than the range of the weight ratio of PVA (A) to the water-insoluble cellulose polymer (B) being 95/5 to 50/50. Outside the range of 95/5 to 5/95, a desirable fiber readily fibrillatable cannot be produced. By the method, furthermore, any of the polymer (C) and the water-insoluble cellulose polymer (B) may be the component of islands. The amine oxide solvent to be used in the method includes N-methyl morpholine-N oxide (abbreviated to "N-MMO"), dimethyl ethanol amine-N-oxide, dimethyl homopiperidine-N-oxide, dimethyl benzyl amine-N-oxide, N,N,N-trimethyl amine-N-oxide, and the like. The solvent may be an aqueous solution containing 50% or more by weight of these solvents described above. From the respect of solubility of cellulose and safety, in particular, N-MMO monohydrate satisfying the relationship [N-MMO/(N-MMO+water)=87%] is most preferable.

By the method, an amine oxide solvent is melted at 80 to 110° C., to which is added water if necessary and are further added the polymer (C) and the water-insoluble cellulose polymer (B), for mixing at 90 to 100° C. under agitation, to prepare a spinning solution. The polymer concentration in the spinning solution is preferably 5 to 30% by weight; the viscosity of the spinning solution is appropriately 100 to 50,000 poises for dry-jet wet spinning process while the viscosity is 10 to 1,000 poises for wet spinning process. The resulting spinning solution is discharged from a nozzle, passed through an air gap and is then introduced into a solidifying bath (dry-jet wet spinning process), or is discharged directly into a solidifying bath (wet spinning process) for solidification. As the solidifying bath, use is made of water [provided that the polymer (C) is a water-insoluble polymer], organic solvents such as methanol and acetone, mirabilite and an aqueous ammonium sulfate solution. After passing through the solidifying bath, the solidified product is prepared into a fiber by the same method as described above.

Within the scope of the object of the present invention, still additionally, the fiber containing the PVA and the cellulose polymer in accordance with the present invention may contain an inorganic pigment, an organic pigment, a dye, a heat-resistant deterioration preventive agent, a pH adjusting agent, a crosslinking agent, an oiling agent, and the like, which may be added at individual production stages, such as the stage of the spinning solution, the solidifying stage, the extraction stage, immediately before drying, immediately before drawing, after heat drawing, after thermal treatment and after post-reaction.

The fiber thus produced is prepared into a fibril through the single action of chemical swelling force or mechanical stress or the combined action thereof. The size of the fibril in accordance with the present invention is 0.05 to 8 $\mu$m expressed in terms of equivalent diameter. In accordance with the present invention, the size of the fibril is determined as follows; enlarging the cross section of the fibril by a scanning or transmission electron microscope, and measuring the cross sectional area, a diameter of a circle of the same area as the cross sectional area is defined as the size. The additive average of n=20 or more is defined as the size of a fibril bundle. The fibril of a size less than 0.05 $\mu$m is so thin that the fibril tangles to each other to form a fibril clot so that the fibril cannot be dispersed uniformly. Then, such fibril cannot serve the role of a fibril. Alternatively, the fibril of a size above 8 $\mu$m is so large that the specific surface area is too small. Hence, such fibril cannot serve fibril functions such as the capturing of inorganic particles. From the respect of the reinforcing performance, absorptivity of alkaline solutions, captivity of particles and dispersibility as fibril, the size of the fibril is preferably 0.2 to 5 $\mu$m, and more preferably 0.6 to 2.5 µm. The size of the fibril has some correlation with the size of the islands in the fiber of the present invention, but the fibril is not always disintegrated completely into the islands component. When the fiber is of a three-phase structure wherein islands are further present in the islands as the islands component, there is every probability that the islands component is further disintegrated. Hence, the size of the fibril does not necessarily coincide with the size of the islands in the fiber prior to beating.

The whole surface of the fibril may be covered with the sea component PVA, but preferably, the cellulose polymer as the islands component may sometimes be exposed to a part of the fibril surface. Evaluation of the absorptivity of alkaline solutions by changing the beating time of the sea-islands fiber of PVA and cellulose indicates that the absorptivity of the fiber is almost similar to the absorptivity of PVA alone, though the fiber prior to beating contains cellulose with absorptivity of alkaline solutions. However, the progress in beating increases the absorptivity of alkaline solutions, and when the beating is promoted to some extent, the size of the fibril tends to decrease, but the absorptivity of alkaline solutions tends to be level-off, which is an unexpected finding. The reason is not completely elucidated, but is presumed as follows. The whole surface of the fiber prior to beating is covered with PVA with lower swelling in alkalis, so even if alkali swellable cellulose is present inside the fiber, the PVA on the surface serves a role of so-called "hoop." Therefore, such fiber has only absorptivity of alkaline solutions of a fiber comprising PVA alone, but after beating, the fiber is disintegrated in between the PVA layer and the cellulose layer, to expose the cellulose layer onto the surface. Thus, the PVA "hoop" is released, so that the fiber exerts the absorptivity of alkaline solutions being inherent to cellulose. Further progress in beating decreases the size of the fiber, so that the "hoop" of PVA is lost. Then, the absorptivity of alkaline solutions possibly reaches a level-off point with no increase any more. Thus, based on the foregoing presumption fibrillation not only decreases the fiber diameter. For the utilities with significance on absorptivity of alkaline solutions, such as the separator in alkali manganese batteries, the fibril wherein components with higher absorptivity of alkaline solutions are exposed to the surface thereof, should be present preferably at 10% or more, more preferably at 20% or more, and still more preferably at 30% or more.

The ratio of the fibril wherein components with higher absorptivity of alkaline solutions are exposed to the surface thereof, in accordance with the present invention, is simply represented by the incremental ratio of the weight of alkaline solutions absorbed into the fiber after beating to the weight of alkaline solutions absorbed into the fiber prior to beating.

The aspect ratio (length/diameter) of the fibril is 50 or more. If the aspect ratio is less than 50, the reinforcing performance and captivity of particles are insufficient. If the aspect ratio is above 2,000, the fibril tangles to each other more severely, involving difficulty in uniform dispersion thereof, whereby a certain procedure is necessary for the dispersion. From the respect of reinforcing performance and captivity, the aspect ratio is preferably 100 or more, more preferably 200 or more. The term "diameter" herein referred to means the diameter of a circle having the average cross sectional area of the fibril.

A method for producing the fibril of the present invention will now be described below. The fibril is produced by applying chemically swellable force or mechanical stress singly or in combination therewith, preferably, to the fiber of a sea-islands structure of the present invention comprising PVA (A) and the water-insoluble cellulose polymer (B). In accordance with the present invention, the term "chemically swellable force" means a potency to swell the sea component PVA (A) or the islands component cellulose polymer (B). In order to expand PVA (A), typically PVA (A) should be brought into contact with water. The swellability in water of the water-insoluble cellulose polymer (B) as the islands component is small, thus stress deformation occurs between the PVA layer and the cellulose polymer layer due to the difference in the swelling force. If the deformation is large, disintegration occurs only through such swelling forces. Because the adhesion strength between the PVA (A) and the cellulose polymer (B) is not necessarily great, the fiber of the present invention may eventually be disintegrated under a higher mechanical shear force, but the fiber is more completely disintegrated and fibrillated if the mechanical shear force is applied to the fiber, preferably in a state of swelling deformation. The effect of chemically swelling force on fibrillatability is large. The fiber of the present invention is characterized to a great extent in that the chemically swelling force is obtained from water as an inexpensive substance without needing any treatment for antipollution or recovery. Some has indicated that the swelling of the islands phase is important for fibrillation but the swelling of the sea phase would not contribute to ready fibrillation. Nevertheless, the investigative results of the fiber of the present invention reasonably indicate that the swelling of the sea phase alone is sufficiently effective and that the increase in the inner deformation due to the difference in the swelling force between the sea phase and the islands phase is effective for ready fibrillation.

Then, fibrillation methods include a method comprising fibrillating a fiber and forming the resulting fibril into a sheet form; and a method comprising forming a fiber into a sheet form prior to fibrillation.

Herein, the former method comprises cutting the fiber of the present invention into short pieces of 1 to 30 mm, immersing and dispersing the pieces into water, fibrillating the pieces through mechanical stress by means of a beater, refiner, mixer and the like, and making paper from the resulting fibril as a base paper material or dispersing the fibril in a cement solution to make a material. A thin and strong paper of a higher bulk density can be produced because the paper comprises a finer fiber owing to fibrillation. A porous paper is preferable for use in the separator in alkali manganese batteries, because the interfiber absorption weight of solutions can be increased. Preferably, the fibril of the present invention is mixed with other materials, for example vinylon of 0.3 to 1 d and is then made into a paper, so that the paper might acquire porosity. The separator thus produced works as a solution with higher absorptivity of alkaline solutions in both of the interfiber space and the intrafiber space. When the fibril is mixed with inorganic fine particles or thermosetting plastic fine particles under agitation, the fine particles are captured into the fibril whereby the particles are made into a molded material. Thus, a frictional material suitable for use in brakeshoe and clutch plate can be produced.

The latter method includes a typical method comprising crimping and cutting the fiber of the present invention into a staple, subsequently passing the staple through a carding machine to form a web, and applying a high-pressure water jet of 30 kg/cm$^2$ or more, preferably 60 kg/cm$^2$ or more onto the web, thereby fibrillating the fiber of the present invention via the impact from or shear force of the high-pressure water jet; or the method may comprise cutting the fiber of the present invention into pieces of 1 to 30 mm, dispersing the pieces as a paper material in water to prepare a base paper material by wet process, and applying a high-pressure water jet of 30 kg/cm² or more, preferably 60 kg/cm² or more onto the paper, thereby fibrillating the fiber of the present invention via the impact or shear of the high-pressure water jet. Because of the fibrillation with a high-pressure water jet after web formation, the method is advantageous in that poor dispersion due to the presence of fibril or a higher bulk density due to the presence of fibril can be avoided to produce a porous, two-dimensional sheet despite the sheet comprising a superfine fiber. The sheet is useful as battery separator, and is also useful as wipers and filters.

Furthermore, a composite fiber comprising two incompatible fiber material polymers except PVA has conventionally been disintegrated through high-pressure water jet, but the processability up to the high-pressure water jet process and the disintegratability during the high-pressure water jet process are incompatible because they are in negative correlation. More specifically, a fiber readily fibrillatable in a high-pressure water jet process is so readily disintegrated in the processes of spinning, drawing, crimping and carding, to cause a trouble in these processes. Conversely, a composite fiber with lower disintegratability never involving any trouble in the processability until the web formation process, is hardly fibrillated at the high-pressure water-jet process, so that a nonwoven fabric comprising a superfine disintegrated fiber is unlikely to be produced.

Alternatively, the PVA-based fiber of the present invention has lower fibrillatability in its dry state prior to the high-pressure water jet process, as has been described above. Therefore, the trouble due to fibrillation may be less in the dry process; and in its wet state by high-pressure water jet, the inner deformation is enlarged so instantly, that fibrillation is readily induced in the fiber via high-pressure water jet.

Because the fiber of the present invention is also disintegrable through a strong mechanical shear force alone, a needle punch method is additionally used as one of the fibrillation methods. As has been described above, however, the fiber of the present invention is far more fibrillated with a mechanical shear force in its state with wet deformation. Thus, the needle punch method should be conditioned strictly. Specifically, the fibrillation should be carried out under the conditions of a needle punching density of preferably 250 punches/cm² or more, and more preferably 400 punches/cm² or more.

For the method for producing a dry laid web to be used in the water-jet method or the needle punch method, the carding method includes generally known methods by means of roller card, semi-random card, and random card; and the web formation method includes generally known processes of tandem web, cross web, and coulisse cross web.

The method for producing a wet laid base paper material to be used in the water-jet method includes those using paper machines of circular net, short net, long net and the like; any base paper material in preparation, in its dry state or prior to drying, is satisfactory, provided that the material can be introduced onto a support for water-jet process.

As the raw material to be mixed into a web or into a base paper material together with the fiber of the present invention, generally known materials are used, including rayon, solvent-spun cellulose fiber, polynosic, polyester, acrylics, nylon, polypropylene, and vinylon.

As to the web lamination, not only lamination of an identical web at least partially containing the fiber of the present invention but also lamination of webs with different mixing ratios of the fiber of the present invention or lamination of the web at least partially containing the fiber of the present invention with a web without the fiber of the present invention may be satisfactory. In other words, satisfactorily, the fiber of the present invention may partially be contained in such web in its fibrillated state, and therefore, the fiber may satisfactorily be present not uniformly but unevenly.

To the resulting nonwoven fabric may be added generally known resin binders of such as vinyl acetate, acrylic, polyethylene, vinyl chloride, urethane, polyester, epoxy, rubber binders by an emulsion binder imparting method and a powdery method, including saturation method, spraying method, printing method, and foaming method.

The present invention will now be described more specifically with reference to working examples, but the present invention is not limited to these examples.

EXAMPLE 1

PVA of a polymerization degree of 1,750 and a saponification degree of 99.9 mole % and cellulose acetate (abbreviated to "CA" hereinafter) with a polymerization degree of 180 and an acetylation degree of 55% were added and dissolved in dimethyl sulfoxide (hereinafter abbreviated to "DMSO") under agitation at 80° C. in a stream of nitrogen for 10 hours, to prepare a mixed solution, slightly colored brown, of a PVA/CA weight ratio of 70/30 and a total polymer concentration of 18% by weight. The solution, not absolutely clear but slightly opaque, was a solution of sea-islands phase separation wherein PVA. was the sea component and CA was the islands component. Even after leaving the solution to stand without agitation at 80° C. for 24 hours, not any tendency of further phase separation was observed in the solution. The solution was thus a stable solution in uniform dispersion. Passing the solution as a spinning solution through a spinneret of 1,000 orifices of 0.06 mm in diameter to wet spin the solution in a solidifying bath of a DMSO/methanol weight ratio of 25/75 and a temperature of 10° C., wet drawing of 3.5 times, extracting the DMSO contained in the yarn into methanol, and drying the resulting yarn in hot air at 80° C., prior to dry heat drawing at 220° C. to a total draw ratio of 13, a PVA/CA sea-islands fiber was produced. Subjecting then the fiber to a treatment in 1N caustic soda at 50° C. for 30 minutes to saponify CA into cellulose and immersing then the resulting fibers in a bath of 30 g/liter formaldehyde, 200 g/liter sulfuric acid and 150 g/liter mirabilite at 70° C. for 30 minutes, the PVA was acetalized. The cross section of the fiber was enlarged by a transmission electron microscope to determine the size of the islands, the result of which was 1.2 μm. Islands of any circular shape were hardly observed, but the islands were of irregular shapes such as angular shapes with four angles or more, star shape, ameba shape and the like. The multi-filament yarn of 2,000 d/1,000 f had a strength of 10.2 g/d, while the fiber had a strength of 11.2 g/d. Despite 30-wt % content of CA as the islands component, the fiber had a relatively high strength and a hot water-fusion temperature as high as 120° C., which probably indicated that the sea component PVA was sufficiently orientated and crystallized. The beatability of the fiber was 18 minutes.

The PVA/cellulose sea-islands fiber was then cut into pieces of a length of 2 mm, and 5 g of the cut pieces was dispersed in water (500 milliliters; mL), followed by beating and agitation by means of a home juice mixer (National MX-X40) for 10 minutes. The resulting beaten solution was filtered under aspiration to recover a water-containing fibril.

The fibril was then observed with an optical microscope and an electron microscope. The fibril was of an average size of 1.0 μm and an aspect ratio of 800, having irregular cross sectional shapes with no circular shape. The diameter of the fiber prior to beating process was about 15 μm.

Adding the water-containing fibril (4 g; sheer weight) and a PVA binder fiber (0.2 g) of 1 denier and 3 mm into water (1.5 liters), and sufficiently disaggregating the mixture by means of a disaggregating machine, followed by addition of a viscous agent and sufficient agitation, a solution for paper preparation was recovered. Adding water to the solution for paper preparation (300 mL) to a final volume of 1 liter, a paper was made by means of a Tappi paper machine. The resulting paper was dehydrated sufficiently with a filter No. 3, followed by drying by means of a roll dryer at 110° C. for 85 seconds, a hand-made paper of 40 g/m² was produced.

The intrafiber absorptivity of alkaline solutions of the resulting paper was 2.2 g/g, which was apparently higher than the 0.5 g/g absorptivity of alkaline solutions of a paper produced from a conventional vinylon fiber of 1 denier and which was comparable to the 2.2 g/g absorptivity of alkaline solutions of a paper produced from a mixture of beaten polynosic fiber and vinylon fiber. The paper had such greater absorptivity of alkaline solutions. The intrafiber absorptivity of alkaline solutions of a paper was measured as follows. Immersing a paper of a 5-cm×5-cm size (weighing WD (g) after drying) in 35 wt % aqueous KOH solution at 20° C. for 30 minutes, and then centrifuging the solution at 3,000 rpm for 10 minutes to remove the liquid, the weight of the resulting paper (WC (g)) was measured. The absorptivity was obtained by the formula (WC−WD)/WD (g/g).

Reference Example 1

The PVA/cellulose sea-islands fiber produced in Example 1 was cut into 2-mm pieces, which were then made as such into a paper with no beating treatment. Although the intrafiber absorptivity of alkaline solutions of the paper was 1.0 g/g, indicating considerable improvement in the absorptivity compared with those of conventional vinylon fibers, sufficient effect of the improvement was not observed. This may be because the uppermost surface of the fiber was covered with the poorly alkali swellable PVA, working as a "hoop" in the fiber, even though the fiber contained the alkali swellable cellulose inside.

EXAMPLE 2

PVA of a polymerization degree of 4,000 and a saponification degree of 99.1 mole % and cellulose acetate with a polymerization degree of 110 and an acetylation degree of 45% were dissolved in DMSO under agitation as in Example 1, to produce a homogenous solution in fine dispersion with slight opaqueness, of a PVA/CA weight ratio of 63/37 and a total polymer concentration of 13% by weight. Even after leaving the solution to stand for one day, no apparent change in the phase separation state was observed. The solution was thus stable. Passing the solution as a spinning solution through a spinneret of 500 orifices of 0.08 mm in diameter to wet spin the solution in a solidifying bath of a DMSO/methanol weight ratio of 30/70 and a temperature of 5° C. wet drawing of 3.5 times, followed by extraction, drying and dry heat drawing at 235° C. to a total draw ratio of 12, a PVA/CA sea-islands fiber was produced wherein CA was the islands component. The size of the islands was 1.8 μm in the blend fiber. The islands were of irregular shapes with no circular shape. The multi-filament yarn of 1,000 d/500 f had a strength of 8.5 g/d, while the fiber had a strength as high as 9.2 g/d. The fiber had a hot water-fusion temperature as high as 118° C., which probably indicated that the sea component PVA was sufficiently orientated and crystallized. The beatability of the fiber was 20 minutes.

The PVA/cellulose sea-islands fiber was then crimped and cut into pieces of a length of 38 mm, and the resulting staple fiber was passed through a parallel carding machine to produce a web of 40 g/m². letting the web by splashing water onto the web and then exposing the web to high-pressure water jet of 80 kg/cm², the fiber was disintegrated and entangled together.

The microscopic observation of the resulting nonwoven fabric demonstrated that the fiber was disintegrated into a fibril of a size of 2 μm and an aspect ratio of 2,000 or more. The diameter of the non-beaten fiber prior to the high-pressure water jet process was 15 μm.

Comparative Example 1

As in Example 2 except for the exposure to high-pressure water jet of 20 kg/cm², a nonwoven fabric was produced through water-jet. The microscopic observation of the nonwoven fabric showed hardly any presence of disintegrated fibril.

EXAMPLE 3

Crimping and cutting the PVA/cellulose fiber produced in Example 1, passing the resulting staple fiber through a carding machine to form a web, wetting the web in water, exposing the web to high-pressure water jet of 60 kg/cm² and 80 kg/cm² each for 2 seconds, followed by drying, a nonwoven fabric of 40 g/m² was produced. The microscopic observation of the resulting nonwoven fabric demonstrated that the fiber was disintegrated into a fibril of a size of 1.2 μm and an aspect ratio of 2,000 or more. Forming the fiber prior to disintegration into a sheet form like web, and fibrillating the fiber while the fiber kept the sheet form, a nonwoven fabric in uniform dispersion was produced, even at an aspect ratio of 2,000 or more.

The interfiber absorptivity and intrafiber absorptivity of alkaline solutions of the nonwoven fabric were measured to be 6.2 g/g and 2.9 g/g, respectively. The paper prepared in a wet process from the fibril of Example 1 had an intrafiber absorptivity of alkaline solutions as high as 2.2 g/g, but the interfiber absorptivity of alkaline solutions thereof was as low as 2.5 g/g. This may possibly be due to the fact that the sheet was prepared from the superfine fibril formed, and therefore, the sheet was highly dense with less space in the fiber. The paper prepared in a wet process from the non-beaten fiber produced in the Reference Example had an intrafiber absorptivity of alkaline solutions as low as 1.0 g/g, but an interfiber absorptivity of alkaline solutions as high as 6.0 g/g. A nonwoven fabric produced through water-jet from the wet laid card web in the present Example had higher values of the intrafiber and interfiber absorptivities of alkaline solutions. The interfiber absorptivity of solutions of paper and dry laid nonwoven fabric in sheet forms was determined as follows. Immersing a sample of 5-cm×5-cm (weighing WD (g) after drying) in a 35-wt % aqueous KOH solution at 20° C. for 30 minutes, and dropping droplets for 30 seconds, the weight then was defined as WT (g). The total absorptivity of solutions, namely (WT−WD)/WD, was determined. Then, the intrafiber absorptivity of solutions was determined as described above. The absorptivity of solutions of the sheet-form paper and nonwoven fabric was obtained by subtracting the intrafiber absorptivity from the total absorptivity of solutions.

Comparative Example 2

As in Example 1 except that the PVA/CA weight ratio was 97/3 and the total polymer concentration was 16% by weight, processes of dissolution, spinning and dry heat drawing were carried out to produce a PVA/CA blend fiber. The fiber was dispersed in water, followed by agitation and beating treatment by means of a juice mixer for 40 minutes as in Example 2. Subsequent microscopic observation of the resulting fiber demonstrated hardly any tendency of disintegration or fibrillation. The fiber had a beatability of 40 minutes or more.

Comparative Example 3

As in Example 1 except that the PVA/CA weight ratio was 40/60 and the total polymer concentration was 25% by weight, dissolution in DMSO was effected. Attempts were made to spin the resulting solution in the same manner as in Example 1, but normal discharge of the solution from a nozzle involved much difficulty. Additionally, the resulting gel yarn was weak, so the yarn could not pass through the subsequent process for preparing fiber. This may be because the sea component was CA which worked as a matrix at the solution stage.

EXAMPLE 4

Crimping and cutting the PVA/cellulose fiber produced in Example 2 into 40-mm pieces, and passing the resulting staple fiber through a semi-random carding machine, a semi-random web (A) of 15 g/m$^2$ was formed. Using a staple of rayon of 1.3 denier and 40 mm, a semi-random web (B) of 30 g/m$^2$ was produced.

Laminating these webs together by means of a wrapper so that the web (A) might be on the upper and lowest layers and the web (B) might be on the intermediate layer, and placing then the laminate on a metallic net-woven belt, and applying high-pressure water jet of 80 kg/cm$^2$ to disintegrate and entangle the fiber, drying the resulting product at a dryer temperature of 110° C., a dry laid nonwoven fabric of 60 g/m$^2$ was produced through water-jet.

The microscopic observation of the resulting nonwoven fabric demonstrated that the fiber was disintegrated into a fibril of a size of 2 μm and an aspect ratio of 2,000 or more, wherein individual webs were satisfactorily entangled together.

Comparative Example 4

Passing a staple of rayon of 1.3 denier and 40 mm through a semi-random carding machine in the same manner as in Example 4, semi-random webs of 15 g/m$^2$ and 30 g/m$^2$ were produced.

Laminating these webs together by means of a wrapper so that the web of 15 g/m$^2$ might be on the upper and lowest layers and the web of 30 g/m$^2$ might be on the intermediate layer, and placing then the laminate on a metallic net-woven belt, and applying high-pressure water-jet of 80 kg/cm$^2$ to disintegrate and entangle the fiber, drying the resulting product at a dryer temperature of 110° C., a dry laid nonwoven fabric of 60 g/m$^2$ was produced through water-jet.

The resulting nonwoven fabric had a density lower than that of the nonwoven fabric produced in Example 4, with poor wiping performance of glass lens.

EXAMPLE 5

Crimping the PVA/cellulose sea-islands fiber produced in Example 1 and cutting then the fiber into 51-mm pieces, the resulting staple fiber was subjected to carding with a parallel card, followed by needle punching at a needle punching density of 450 punches/cm$^2$ onto a cross web prepared by a cross wrapper, to disintegrate and entangle the fiber together, whereby a dry laid nonwoven fabric of 400 g/m$^2$ was produced.

The microscopic observation of the resulting nonwoven fabric demonstrated that the fiber was disintegrated into a fibril of a size of 4 μm and an aspect ratio of 500 or more, wherein individual fibrils were satisfactorily entangled together. The non-beaten fiber prior to the needle punch process was of a diameter of 15 μm.

EXAMPLE 6

The PVA/cellulose sea-islands fiber, produced in Example 1 and then cut into 15-mm pieces, and wood pulp were mixed together in amounts of 40% by weight and 60% by weight, respectively, to prepare a slurry. The slurry was then prepared into a paper by means of a paper machine with a short net, and the resulting paper was dried at a dryer temperature of 110° C. to prepare a base paper material of 25 g/M$^2$.

Laminating four sheets of the base paper material together and then placing the laminate on a metallic net-woven belt, followed by exposure to high-pressure water jet of 100 kg/cm$^2$, to disintegrate and entangle the fiber, the resulting product was then dried at a dryer temperature of 110° C., a wet laid nonwoven fabric of 91 g/m$^2$ was produced.

The microscopic observation of the nonwoven fabric demonstrated that the fiber was disintegrated into a fibril of a size of 1 μm and an aspect ratio of 2,000 or more, wherein individual fibrils were satisfactorily entangled together. The diameter of the non-beaten fiber prior to the high-pressure water jet process was 15 μm.

EXAMPLE 7

PVA of a polymerization degree of 1,750 and a saponification degree of 99.8 mole % and CA with a polymerization degree of 180 and an acetylation degree of 55% were dissolved in DMSO under agitation at 200 rpm in a stream of nitrogen at 100° C. for 10 hours, to produce a PVA/CA mixed solution of a PVA/CA weight ratio of 60/40 and a total polymer concentration of 20% by weight. The solution was opaque. The observation of the phase structure by the method described above demonstrated that the phase structure had a particle diameter of 3 to 10 μm, wherein PVA was the sea component and CA was the islands component in the solution of sea-islands phase separation. After leaving the solution to stand for 8 hours for defoaming, absolutely no apparent tendency of separation into two phases was observed. It was confirmed that the solution had such a quite stable phase structure.

The solution at 100° C. was passed as a spinning solution through a spinneret of 1,000 orifices of a diameter of 0.08 mm to wet spin the solution in a solidifying bath of a DMSO/methanol weight ratio of 25/75 and a temperature of 7° C., wet drawing of 3.5 times, followed by extraction of the DMSO contained in the yarn into methanol. As the final extraction bath, a bath comprising methanol/methyl isobutyl ketone/water at 54/36/10 in weight composition was used. Adding an oiling agent to the fiber after extraction, drying then the fiber in hot air at 80° C., and further dry heat drawing the fiber at 230 ° C. to a final total drawing ratio (namely, wet drawing ratio×dry heat drawing ratio) of 16, a PVA/CA sea-islands fiber was produced. The fiber strength of the fiber was 10.3 g/d; the beatability was about 200 seconds; and the water filtration time after 5-min beating was 120 seconds. The cross section of the fiber was enlarged with a transmission electron microscope to determine the size of the islands, the result of which was 1.2 μm.

Cutting the sea-islands fiber into 2-mm pieces, and dispersing then 5 g of the pieces in water (500 mL) followed by agitation and beating by means of a home juice mixer (National MX-X40) for 5 minutes, filtering the beaten solution under aspiration, a water-containing fibril was recovered. The observation of the fibril with an optical microscope and an electron microscope demonstrated that the fibril had a diameter of 1.0 μm and an aspect ratio of about 1,000, with irregular cross-sectional shapes without any circular shape. The diameter of the fiber prior to the beating process was 15 μm.

EXAMPLE 8

Immersing preliminarily conifer pulp with ana-cellulose content of 97% in methanol, and subjecting the pulp to preliminary processes of liquid removal, grinding, and drying under reduced pressure, a cellulose pulp with a polymerization degree of 450 was prepared. N-MMO Monohydrate was liquefied, followed by addition of water, to prepare an aqueous N-MMO solution of 70% by weight. While keeping the aqueous solution at 100° C., the cellulose pulp and PVA of a polymerization degree of 1,750 and a saponification degree of 99.9 mole % were added at a cellulose/PVA weight ratio of 40/60 into the aqueous N-MMO monohydrate solution to a final concentration of the total of the cellulose and PVA being 11% by weight to the aqueous solution, followed by addition and dissolution of aqueous hydrogen peroxide and oxalic acid as antioxidants at 0.8% by weight to the total weight of the cellulose and PVA. Agitation of the resulting solution was continued in nitrogen atmosphere for 5 hours, to recover a viscous, semi-turbid solution. The islands phase of the solution primarily comprised the cellulose, and the size was about 5 μm. The solution was discharged as a spinning solution from a spinning nozzle of 400 orifices of 0.09 mm in diameter directly into a methanol bath. Then, wet drawing of 3.5-fold was effected, followed by extraction of N-MMO in methanol and drying and subsequent further dry heat drawing to 12-fold at 230° C. The resulting fiber was 800 d /400 f, and had a fiber strength of 6.8 g/d and a beatability of 25 minutes, wherein the islands component was cellulose and the sea component was PVA. Cutting the fiber in 2-mm pieces and beating the resulting pieces in water by means of the home juice mixer, a fibril of a diameter of about 1 μm and an aspect ratio of 700 was produced.

INDUSTRIAL APPLICABILITY OF THE INVENTION

The sheet produced by using the fibril in accordance with the present invention is very excellent in terms of density, shielding performance, alkali resistance, opacity, wiping performance, water absorptivity, oil absorptivity, moisture permeability, heat insulating properties, weatherability, high strength, high tear force, abrasion resistance, electrostatic controllability, drape, dye-effinity, safety and the like. Thus, the sheet may be used for applications, including various filter sheets such as air filter, bag filter, liquid filter, vacuum filter, water drainer filter, and bacterial shielding filter; sheets for various electric appliances such as capacitor separator paper, and floppy disk packaging material; various industrial sheets such as FRP surfacer, tacky adhesive tape base cloth, oil absorbing material, and paper felt; various wiper sheets such as wipers for homes, services and medical treatment, printing roll wiper, wiper for cleaning copying machine, and wiper for optical systems; various medicinal and sanitary sheets, such as surgical gown, gown, covering cloth, cap, mask, sheet, towel, gauze, base cloth for cataplasm, diaper, diaper liner, diaper cover, base cloth for adhesive plaster, wet towel, and tissue; various sheets for clothes, such as padding cloth, pad, jumper liner, and disposable underwear; various life material sheets such as base cloth for artificial leather and synthetic leather, table top, wall paper, shoji-gami (paper for paper screen), blind, calendar, wrapping, portable heater (kairo) bag and packages for drying agents, shopping bag, wrapping cloth (furoshiki), suit cover, and pillow cover; various agricultural sheets, such as cooling and sun light-shielding cloth, lining curtain, sheet for overall covering, light-shielding sheet and grass preventing sheet, wrapping materials of pesticides, underlining paper of pots for seeding growth; various protection sheets such as fume prevention mask and dust prevention mask, laboratory gown, and dust preventive clothes; various sheets for civil engineering building, such as house wrap, drain material, filtering medium, separation material, overlay, roofing, tuft and carpet base cloth, dew prevention sheet, wall interior material, soundproof or vibrationproof sheet, wood-like board, and curing sheet; and various automobile interior sheet, such as floor mat and trunk mat, molded ceiling material, head rest, and lining cloth, in addition to a separator sheet in alkaline batteries.

When the fiber of the present invention is dispersed together with inorganic particles under agitation, the fiber is fibrillated to produce a fibril with good particle captivity and reinforcing performance and superior thermal resistance and flame retardation. Therefore, the fibril is useful as a frictional material. When the fibril is mixed and dispersed in cement, the fibril captures cement particles very strongly and additionally exerts the reinforcing property of cement. Therefore, a slate plate with a higher strength can be produced readily.

What is claimed is:

1. A readily fibrillatable fiber of a sea-islands structure, comprising a vinyl alcohol based polymer (A) and a water-insoluble cellulose based polymer (B), wherein A is the sea component and B is the islands component in the fiber cross section, characterized in that the size of the islands is 0.03 to 10 μm on average and the fiber has a tensile strength of 3 g/d or more.

2. A readily fibrillatable fiber of a sea-islands structure according to claim 1, wherein the fiber has a beatability of 30 minutes or less.

3. A readily fibrillatable fiber of a sea-islands structure according to claim 1, wherein the water filtration time after 5-min beating is 75 seconds or more.

* * * * *